United States Patent
Yao et al.

(10) Patent No.: US 11,706,809 B2
(45) Date of Patent: Jul. 18, 2023

(54) RANDOM ACCESS CHANNEL AND ASSOCIATED UPLINK DATA CHANNEL STRUCTURE CONSTRUCTION

(71) Applicant: Apple Inc., Cupertino, CA (US)

(72) Inventors: Chunhai Yao, Beijing (CN); Haitong Sun, Cupertino, CA (US); Chunxuan Ye, San Diego, CA (US); Dawei Zhang, Saratoga, CA (US); Fangli Xu, Beijing (CN); Haijing Hu, Beijing (CN); Hong He, San Jose, CA (US); Jie Cui, San Jose, CA (US); Oghenekome Oteri, San Diego, CA (US); Weidong Yang, San Diego, CA (US); Wei Zeng, San Diego, CA (US); Yang Tang, San Jose, CA (US); Yuchul Kim, San Jose, CA (US); Yuqin Chen, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 17/174,315

(22) Filed: Feb. 11, 2021

(65) Prior Publication Data
US 2021/0251015 A1     Aug. 12, 2021

(30) Foreign Application Priority Data
Feb. 12, 2020    (WO) ................ PCT/CN2020/074944

(51) Int. Cl.
*H04W 74/08*     (2009.01)
*H04W 76/27*     (2018.01)
*H04W 72/21*     (2023.01)

(52) U.S. Cl.
CPC ....... *H04W 74/0833* (2013.01); *H04W 72/21* (2023.01); *H04W 76/27* (2018.02)

(58) Field of Classification Search
CPC ............. H04W 76/27; H04W 72/0413; H04W 74/0833
See application file for complete search history.

(56) References Cited

U.S. PATENT DOCUMENTS

2019/0342921 A1    11/2019   Loehr et al.
2020/0288506 A1*    9/2020   Lei .................... H04W 74/0833
(Continued)

FOREIGN PATENT DOCUMENTS

CN         110537392 A     12/2019

OTHER PUBLICATIONS

Peralta et al. "Two-Step Random Access in 5G NR: Channel Structure Design and Performance" VTC 25-28 Helsinki Apr. 2021 (Year: 2021).*

(Continued)

*Primary Examiner* — Basil Ma
(74) *Attorney, Agent, or Firm* — Fish & Richardson P.C.

(57) ABSTRACT

The implementations disclosed provide apparatus, systems, and methods for channel structure construction for a two-step random access channel (RACH) using a new radio (NR) user equipment (UE) wireless device. The wireless device includes one or more computer processors configured to generate a physical RACH (PRACH) preamble mapped to a physical uplink shared channel (PUSCH) resource unit. The PRACH preamble is associated with a preamble group indicating a configuration of the PUSCH. The preamble group has a size indicated by radio resource control (RRC) signaling performed by the wireless device. A message is encoded including the PRACH preamble and a payload carried by the PUSCH. The configuration of the PUSCH includes parameters for decoding the message. The wireless device couples communicatively to a base station using the PUSCH. The message is transmitted to the base station. The (Continued)

base station decodes the message based on the parameters of the PUSCH configuration.

17 Claims, 9 Drawing Sheets

(56) References Cited

U.S. PATENT DOCUMENTS

| | | | |
|---|---|---|---|
| 2021/0037530 A1* | 2/2021 | Shih | H04W 56/0045 |
| 2021/0210346 A1* | 7/2021 | Shin | C23C 16/505 |
| 2021/0307073 A1* | 9/2021 | Huang | H04W 74/0833 |

OTHER PUBLICATIONS

R1-1910002 ZTE "Remaining issues of msgA channel structure" 3GPP WG1 #98bis Chongqing Oct. 14-19, 2019. (Year: 2019).*

R1-1906746 Nokia "On 2-step RACH Channel Structure" 3GPP WG1 #97 Reno May 13-17, 2019 (Year: 2019).*

3GPP TS 38.321 V15.6.0 "5G NR, MAC protocol specification" (Year: 2019).*

International Search Report and Written Opinion in International Appln. No. PCT/CN2020/074944, dated Nov. 18, 2020, 9 pages.

LG Electronics, "Discussion on Channel Structure for 2-step Rach," 3GPP TSG RAN WG1 Meeting #99, R1-1912262, Reno, USA, Nov. 18-22, 2019, 14 pages.

Nokia et al. "On 2-step RACH Channel Structure," 3GPP TSG RAN WG1 #96bis, R1-1904715, Xi'an, China, Apr. 8-12, 2019, 13 pages.

ZTE el al., "Remaining issues of msgA channel structure," 3GPP TSG RAN WG1 #98bis, R1-1910002, Chongqing, China, Oct. 14-20, 2019, 26 pages.

[No Author Listed], "3rd Generation Partnership Project; Technical Specification Group Radio Access Network; NR; Physical layer procedures for control (Release 16)," 3GPP TS 38.213 V16.0.0, Dec. 2019, 146 pages.

[No Author Listed], 3rd Generation Partnership Project; Technical Specification Group Radio Access Network; NR; Radio Resource Control (RRC) protocol specification (Release 15), 3GPP TS 38.331 V15.8.0, Dec. 2019, 532 pages.

ZTE Corporation, "New work item: 2-step RACH for NR," 3GPP TSG RAN Meeting #82 RP-182894 Sorrento, Italy, Dec. 10-13, 2018, 5 pages.

* cited by examiner

| | PREAMBLE FORMATS | L-RA | SCS [kHz] | T-CP [Ts] | T-CP [ms] | T-SEQ [Ts] | T-SEQ [ms] | T-TOTAL [ms] | T-GUARD [ms] | CELL RADIUS [km] |
|---|---|---|---|---|---|---|---|---|---|---|
| LONG SEQUENCE | 0 | 839 | 1.25 | 3168 | 0.103 | 24576 | 0.8 | 0.903 | 0.097 | 15 |
| | 1 | 839 | 1.25 | 21024 | 0.684 | 2 × 24576 | 1.6 | 2.284 | 0.716 | 107 |
| | 2 | 839 | 1.25 | 4688 | 0.153 | 4 × 24576 | 3.2 | 3.353 | 0.647 | 97 |
| | 3 | 839 | 5 | 3168 | 0.103 | 4 × 6144 | 0.8 | 0.903 | 0.097 | 15 |
| SHORT SEQUENCE | A1 | 139 | $15 \times 2^u$ | $288 \times 2^{-u}$ | | $2 \times 2048 \times 2^{-u}$ | | | | |
| | A2 | 139 | $15 \times 2^u$ | $576 \times 2^{-u}$ | | $4 \times 2048 \times 2^{-u}$ | | | | |
| | A3 | 139 | $15 \times 2^u$ | $864 \times 2^{-u}$ | | $6 \times 2048 \times 2^{-u}$ | | | | |
| | B1 | 139 | $15 \times 2^u$ | $216 \times 2^{-u}$ | | $2 \times 2048 \times 2^{-u}$ | | | | |
| | B2 | 139 | $15 \times 2^u$ | $360 \times 2^{-u}$ | | $4 \times 2048 \times 2^{-u}$ | | | | |
| | B3 | 139 | $15 \times 2^u$ | $504 \times 2^{-u}$ | | $6 \times 2048 \times 2^{-u}$ | | | | |
| | B4 | 139 | $15 \times 2^u$ | $936 \times 2^{-u}$ | | $12 \times 2048 \times 2^{-u}$ | | | | |
| | C1 | 139 | $15 \times 2^u$ | $1240 \times 2^{-u}$ | | $2048 \times 2^{-u}$ | | | | |
| | C2 | 139 | $15 \times 2^u$ | $2048 \times 2^{-u}$ | | $4 \times 2048 \times 2^{-u}$ | | | | |

FIG. 6

Generate, by a wireless device, a physical random access channel (PRACH) preamble mapped to a physical uplink shared channel (PUSCH) resource unit, the PRACH preamble associated with a preamble group indicating a configuration of the PUSCH, the preamble group having a size indicated by radio resource control (RRC) signaling performed by the wireless device
1204

Encode, by the wireless device, a message including the PRACH preamble and a payload carried by the PUSCH, the configuration of the PUSCH including parameters for decoding the message
1208

Couple, by the wireless device, the wireless device communicatively to a base station using the PUSCH
1212

Transmit, by the wireless device, the message to the base station, wherein the base station decodes the message based on the parameters of the configuration of the PUSCH indicated by the preamble group
1216

FIG. 12

RANDOM ACCESS CHANNEL AND ASSOCIATED UPLINK DATA CHANNEL STRUCTURE CONSTRUCTION

CROSS-REFERENCE TO RELATED APPLICATION

This application claims priority to International Application No. PCT/CN2020/074944, filed Feb. 12, 2020, the entire contents of which are incorporated herein by reference.

TECHNICAL FIELD

This description relates generally to wireless devices, and more particularly to apparatus, systems, and methods for channel structure construction for a two-step random access channel (RACH) using a new radio (NR) user equipment (UE) device.

BACKGROUND

Wireless communication systems are rapidly growing in use. Further, wireless communication technology has evolved from voice-only communications to also include the transmission of data, such as Internet and multimedia content. However, establishing timing synchronization between a new radio (NR) user equipment (UE) device and a base station (BS) can sometimes pose challenges. Traditional methods for downlink and uplink synchronization can therefore be inadequate in terms of efficiency and performance.

SUMMARY

The implementations disclosed provide apparatus, systems, and methods for channel structure construction for a two-step random access channel (RACH) using a new radio (NR) user equipment (UE) wireless device. The wireless device includes one or more computer processors configured to generate a physical random access channel (PRACH) preamble mapped to a physical uplink shared channel (PUSCH) resource unit. The PRACH preamble is associated with a preamble group indicating a configuration of the PUSCH. The preamble group has a size and a group index indicated by radio resource control (RRC) signaling performed by the wireless device. A message is encoded including the PRACH preamble and a payload carried by the PUSCH. The configuration of the PUSCH includes parameters for decoding the message. The wireless device couples communicatively to a base station using the PUSCH. The message is transmitted to the base station. The base station decodes the message based on the parameters of the configuration of the PUSCH indicated by the preamble group.

In some implementations, the one or more computer processors are further configured to determine the size of the preamble group using at least one of a ceiling operation or a floor operation performed on a number of contention-based preambles and a number of preamble groups used for a two-step RACH.

In some implementations, the one or more computer processors are further configured to determine the size of the preamble group in accordance with the RRC signaling, the RRC signaling indicating whether the wireless device is in an RRC_IDLE state, an RRC_INACTIVE state, or an RRC_CONNECTED state.

In some implementations, the one or more computer processors are further configured to receive the preamble group from the base station when the wireless device is in the RRC_IDLE state or the RRC_INACTIVE state. A first number of preambles is associated with the RRC_IDLE state of the wireless device or the RRC_INACTIVE state of the wireless device.

In some implementations, a second number of preambles is associated with the RRC_IDLE state of the wireless device or the RRC_INACTIVE state of the wireless device.

In some implementations, the one or more computer processors are further configured to receive the preamble group from the base station when the wireless device is in the RRC_CONNECTED state. A first number of preambles is associated with the RRC_CONNECTED state of the wireless device.

In some implementations, a second number of preambles is associated with the RRC_CONNECTED state of the wireless device.

In some implementations, the preamble group is one of a plurality of preamble groups and the configuration of the PUSCH is one of a plurality of PUSCH configurations associated with the plurality of preamble groups, the plurality of PUSCH configurations further associated with a bandwidth part (BWP).

BRIEF DESCRIPTION OF THE DRAWINGS

FIG. 6 illustrates an exemplary table of preamble formats.

FIG. 12 illustrates a process of operation for apparatus, systems, and methods for channel structure construction for a two-step RACH.

DETAILED DESCRIPTION

Figure 1:
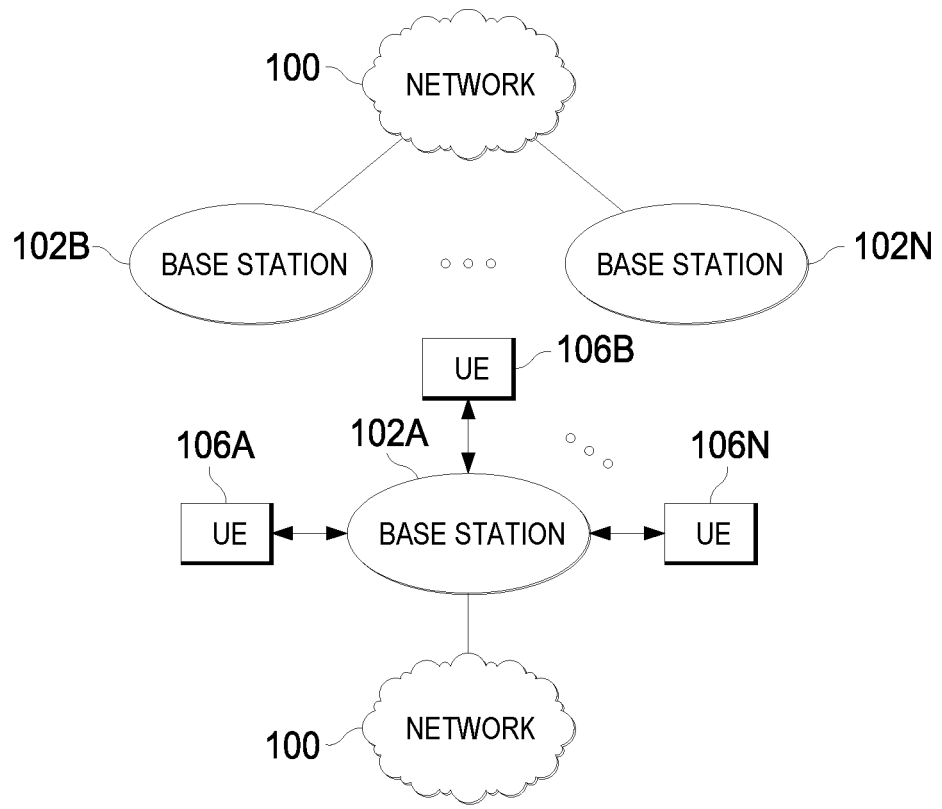
FIG. 1 illustrates an example wireless communication system.

The implementations disclosed provide apparatus, systems, and methods for MsgA channel structure construction for a two-step random access channel (RACH) using a new radio (NR) user equipment (UE) device. The implementations define a mapping between physical RACH (PRACH) preambles and the physical uplink shared channel (PUSCH) resource unit (PRU), thus improving the timing synchronization and efficiency of data transfer between an NR device and a base station (BS). The PRU denotes the time-frequency and demodulation reference signal (DMRS) resources for the PUSCH transmission. The implementations also enable a two-step RACH procedure, reducing latency and improving signaling, thus enabling further performance improvements.

The following is a glossary of terms used in this disclosure.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium can include other types of non-transitory memory as well or combinations thereof. In addition, the memory medium can be located in a first computer system in which the programs are executed, or can be located in a second different computer system which connects to the first computer system over a network, such as the Internet. In the latter instance, the second computer system can provide program instructions to the first computer for execution. The term "memory medium" can include two or more memory mediums which can reside in different locations, e.g., in different computer systems that are connected over a network. The memory medium can store program instructions (e.g., implemented as computer programs) that can be executed by one or more processors.

Carrier Medium—A memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include Field Programmable Gate Arrays (FPGAs), Programmable Logic Devices (PLDs), Field Programmable Object Arrays (FPOAs), and Complex PLDs (CPLDs). The programmable function blocks can range from fine grained (combinatorial logic or look up tables) to coarse grained (arithmetic logic units or processor cores). A programmable hardware element can also be referred to as "reconfigurable logic".

Computer System—Any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—Any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—The term refers to various elements or combinations of elements that are capable of performing a function in a device, such as a user equipment or a cellular network device. Processing elements can include, for example: processors and associated memory, portions or circuits of individual processor cores, entire processor cores, processor arrays, circuits such as an Application Specific Integrated Circuit (ASIC), programmable hardware elements such as a field programmable gate array (FPGA), as well any of various combinations of the above.

Channel—A medium used to convey information from a sender (transmitter) to a receiver. It should be noted that since characteristics of the term "channel" can differ according to different wireless protocols, the term "channel" as used herein can be considered as being used in a manner that is consistent with the standard of the type of device with reference to which the term is used. In some standards, channel widths can be variable (e.g., depending on device capability, band conditions, etc.). For example, LTE can support scalable channel bandwidths from 1.4 MHz to 20 MHz. In contrast, WLAN channels can be 22 MHz wide while Bluetooth channels can be 1 MHz wide. Other protocols and standards can include different definitions of channels. Furthermore, some standards can define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—Refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure can be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form can be automatically filled out by the computer system where the computer system (e.g., software executing on the computer system) analyzes the fields of the form and fills in the form without any user input specifying the answers to the fields. As indicated above, the user can invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—Refers to a value that is almost correct or exact. For example, approximately can refer to a value that is within 1 to 10 percent of the exact (or desired) value. It should be noted, however, that the actual threshold value (or tolerance) can be application dependent. For example, in some implementations, "approximately" can mean within 0.1% of some specified or desired value, while in various other implementations, the threshold can be, for example, 2%, 3%, 5%, and so forth, as desired or as required by the particular application.

Concurrent—Refers to parallel execution or performance, where tasks, processes, or programs are performed in an at least partially overlapping manner. For example, concurrency can be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components can be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors can be configured to electrically connect a module to another module, even when the two modules are not connected). In some contexts, "configured to" can be a broad recitation of structure generally meaning "having circuitry that" performs the task or tasks during operation. As such, the component can be configured to perform the task even when the component is not currently on. In general, the circuitry that forms the structure corresponding to "configured to" can include hardware circuits.

Various components can be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1 illustrates an example wireless communication system. It is noted that the system of FIG. 1 is merely one example of a possible system, and that features of this disclosure can be implemented in any of various systems, as desired.

As shown, the example wireless communication system includes a base station 102A which communicates over a transmission medium with one or more wireless devices 106A, 106B, etc., through 106N. Each of the wireless devices can be referred to herein as a "communication device" or "user equipment" (UE). Thus, the wireless devices 106 are sometimes referred to as UEs or UE devices.

The base station (BS) 102A can be a base transceiver station (BTS) or cell site (a "cellular base station"), and can include hardware that enables wireless communication with the UEs 106A through 106N. The base station 102A is sometimes referred to as a 5G new radio (NR) base station (gNB).

The communication area (or coverage area) of the base station can be referred to as a "cell." The base station 102A and the UEs 106 can be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it can alternately be referred to as an "eNodeB" or "ceNB." Note that if the base station 102A is implemented in the context of 5G NR, it can alternately be referred to as "gNodeB" or "gNB."

As shown, the base station 102A can also be equipped to communicate with a network 100 (e.g., a core network of a cellular service provider, a telecommunication network such as a public switched telephone network (PSTN), and/or the Internet, among various possibilities). Thus, the base station 102A can facilitate communication between the user devices and/or between the user devices and the network 100. In particular, the cellular base station 102A can provide UEs 106 with various telecommunication capabilities, such as voice, SMS and/or data services.

Base station 102A and other similar base stations (such as base stations 102B . . . 102N) operating according to the same or a different cellular communication standard can thus be provided as a network of cells, which can provide continuous or nearly continuous overlapping service to UEs 106A-N and similar devices over a geographic area via one or more cellular communication standards.

Thus, while base station 102A can act as a "serving cell" for UEs 106A-N as illustrated in FIG. 1, each UE 106 can also be capable of receiving signals from (and possibly within communication range of) one or more other cells (which might be provided by base stations 102B-N and/or any other base stations), which can be referred to as "neighboring cells." Such cells can also be capable of facilitating communication between user devices and/or between user devices and the network 100. Such cells can include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some implementations, base station 102A can be a next generation base station, e.g., a 5G New Radio (5G NR) base station, or "gNB." In some implementations, a gNB can be connected to a legacy evolved packet core (EPC) network and/or to a NR core (NRC) network. In addition, a gNB cell can include one or more transition and reception points (TRPs). In addition, a UE capable of operating according to 5G NR can be connected to one or more TRPs within one or more gNBs.

Note that a UE 106 can be capable of communicating using multiple wireless communication standards. For example, the UE 106 can be configured to communicate using a wireless networking (e.g., Wi-Fi) and/or peer-to-peer wireless communication protocol (e.g., Bluetooth, Wi-Fi peer-to-peer, etc.,) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 can also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
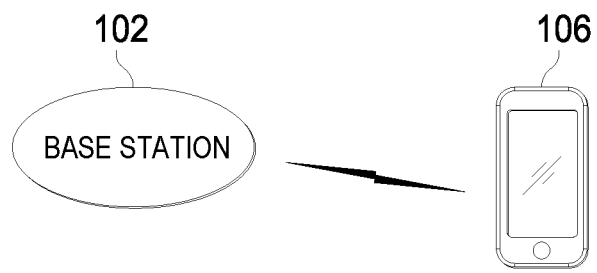
FIG. 2 illustrates a base station (BS) in communication with a user equipment (UE) device.

FIG. 2 illustrates a base station (BS) in communication with a user equipment (UE) device. For example, the UE 106 (e.g., one of the devices 106A through 106N) is in communication with a base station 102, according to some implementations. The UE 106 can be a device with cellular communication capability such as a mobile phone, a hand-held device, a computer or a tablet, or virtually any type of wireless device.

The UE 106 can include a processor that is configured to execute program instructions stored in memory. The UE 106 can perform any of the method implementations described herein by executing such stored instructions. Alternatively, or in addition, the UE 106 can include a programmable hardware element such as a field programmable gate array (FPGA) that is configured to perform any of the method implementations described herein, or any portion of any of the method implementations described herein.

The UE 106 can include one or more antennas for communicating using one or more wireless communication protocols or technologies. In some implementations, the UE 106 can be configured to communicate using, for example, CDMA2000 (1×RTT/1×EV-DO/HRPD/eHRPD) or LTE using a single shared radio and/or GSM or LTE using the single shared radio. The shared radio can couple to a single antenna, or can couple to multiple antennas, such as for multiple input multiple out (MIMO) for performing wireless communications. In general, a radio can include any combination of a baseband processor, analog RF signal processing circuitry (e.g., including filters, mixers, oscillators, amplifiers, etc.,), or digital processing circuitry (e.g., for digital modulation as well as other digital processing). Similarly, the radio can implement one or more receive and transmit chains using the aforementioned hardware. For example, the UE 106 can share one or more parts of a receive and/or transmit chain between multiple wireless communication technologies, such as those discussed above.

In some implementations, the UE 106 can include separate transmit and/or receive chains (e.g., including separate antennas and other radio components) for each wireless communication protocol with which it is configured to communicate. As a further possibility, the UE 106 can include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
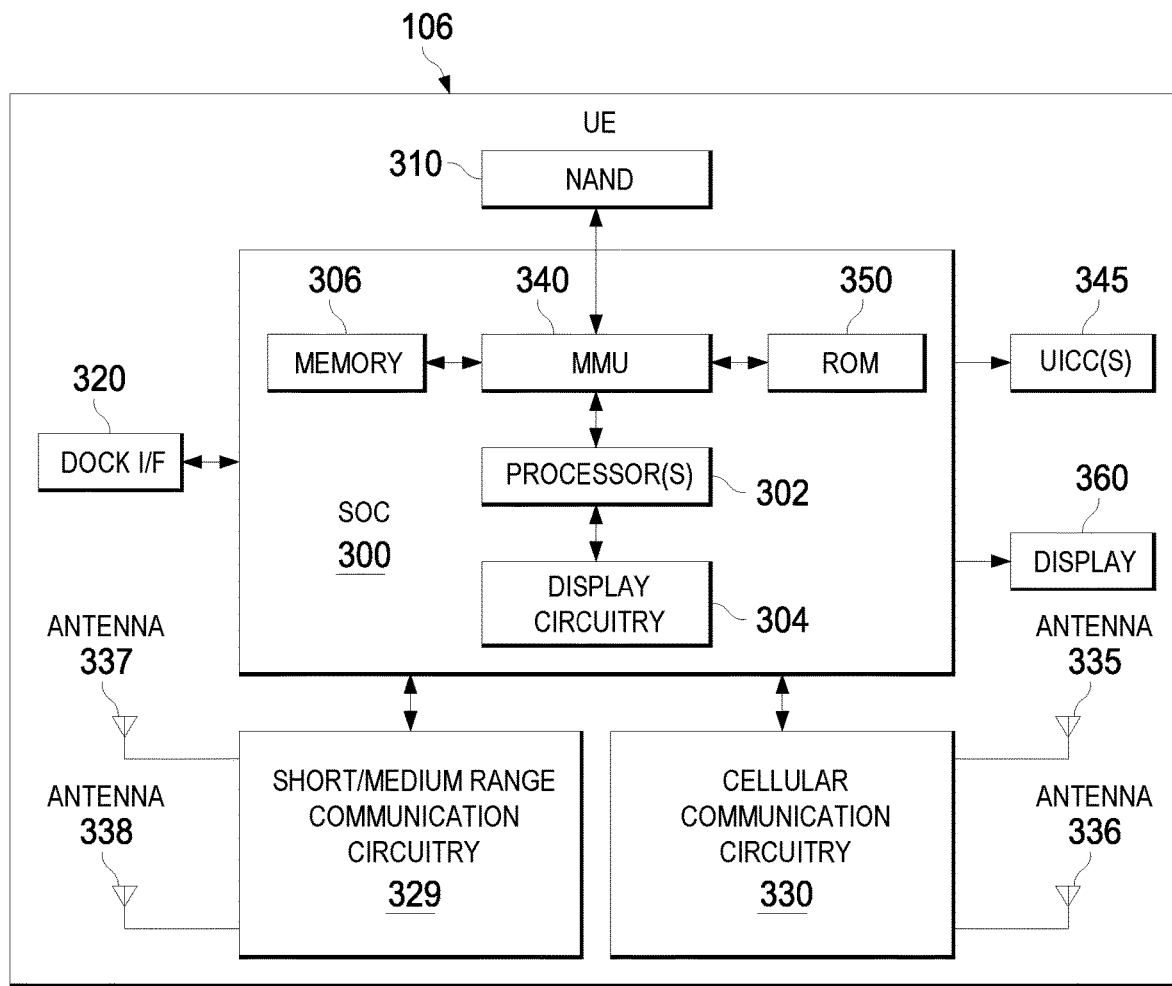
FIG. 3 illustrates an example simplified block diagram of a wireless device.

FIG. 3 illustrates an example simplified block diagram of a wireless device 106. It is noted that the block diagram of the wireless device 106 of FIG. 3 is only one example of a possible wireless device. According to some implementations, wireless device 106 can be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the wireless device 106 can include a set of components 300 configured to perform core functions. For example, this set of components can be implemented as a system on chip (SOC), which can include portions for various purposes. Alternatively, this set of components 300 can be implemented as separate components or groups of components for the various purposes. The set of components 300 can be coupled (e.g., communicatively; directly or indirectly) to various other circuits of the wireless device 106.

For example, the wireless device 106 can include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.,), the display 360, which can be integrated with or external to the wireless device 106, and cellular communication circuitry 330 such as for 5G NR, LTE, GSM, etc., and short to medium range wireless communication circuitry 329 (e.g., Bluetooth™ and WLAN circuitry). In some implementations, the wireless device 106 can include wired communication circuitry (not shown), such as a network interface card, e.g., for Ethernet.

The cellular communication circuitry 330 can couple (e.g., communicatively; directly or indirectly) to one or more antennas, such as antennas 335 and 336 as shown. The short to medium range wireless communication circuitry 329 can also couple (e.g., communicatively; directly or indirectly) to one or more antennas, such as antennas 337 and 338 as shown. Alternatively, the short to medium range wireless communication circuitry 329 can couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 can include multiple receive chains and/or multiple transmit chains for receiving and/or transmitting multiple spatial streams, such as in a multiple-input multiple output (MIMO) configuration.

In some implementations, as further described below, cellular communication circuitry 330 can include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some implementations, cellular communication circuitry 330 can include a single transmit chain that can be switched between radios dedicated to specific RATs. For example, a first radio can be dedicated to a first RAT, e.g., LTE, and can be in communication with a dedicated receive chain and a transmit chain shared with an additional radio, e.g., a second radio that can be dedicated to a second RAT, e.g., 5G NR, and can be in communication with a dedicated receive chain and the shared transmit chain.

The wireless device 106 can also include and/or be configured for use with one or more user interface elements. The user interface elements can include any of various elements, such as display 360 (which can be a touchscreen display), a keyboard (which can be a discrete keyboard or can be implemented as part of a touchscreen display), a mouse, a microphone and/or speakers, one or more cameras, one or more buttons, and/or any of various other elements capable of providing information to a user and/or receiving or interpreting user input.

The wireless device 106 can further include one or more smart cards 345 that include subscriber identity module (SIM) functionality, such as one or more universal integrated circuit cards (UICCs) 345.

As shown, the SOC 300 can include processor(s) 302, which can execute program instructions for the wireless device 106 and display circuitry 304, which can perform graphics processing and provide display signals to the display 360. The processor(s) 302 can also be coupled to memory management unit (MMU) 340, which can be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 can be configured to perform memory protection and page table translation or set up. In some implementations, the MMU 340 can be included as a portion of the processor(s) 302.

As noted above, the wireless device 106 can be configured to communicate using wireless and/or wired communication circuitry. The wireless device 106 can be configured to transmit a request to attach to a first network node operating according to the first radio access technology (RAT) and transmit an indication that the wireless device 106 is capable of maintaining substantially concurrent connections with the first network node and a second network node that operates according to the second RAT. The wireless device 106 can also be configured transmit a request to attach to the second network node. The request can include an indication that the wireless device 106 is capable of maintaining substantially concurrent connections with the first and second network nodes. Further, the wireless device 106 can be configured to receive an indication that dual connectivity with the first and second network nodes has been established.

As described herein, the wireless device 106 can include hardware and software components for implementing the above features for time division multiplexing UL data for NSA NR operations. The processor 302 of the wireless device 106 can be configured to implement part or all of the features described herein, e.g., by executing program instructions stored on a memory medium (e.g., a non-transitory computer-readable memory medium). Alternatively (or in addition), processor 302 can be configured as a programmable hardware element, such as a Field Programmable Gate Array (FPGA), or as an Application Specific Integrated Circuit (ASIC). Alternatively (or in addition) the processor 302 of the wireless device 106, in conjunction with one or more of the other components 300, 304, 306, 310, 320, 329, 330, 340, 345, 350, 360 can be configured to implement part or all of the features described herein.

In addition, as described herein, processor 302 can include one or more processing elements. Thus, processor 302 can include one or more integrated circuits (ICs) that are configured to perform the functions of processor 302. In addition, each integrated circuit can include circuitry (e.g., first circuitry, second circuitry, etc.) configured to perform the functions of processor(s) 302.

Further, as described herein, cellular communication circuitry 330 and short range wireless communication circuitry 329 can each include one or more processing elements. In other words, one or more processing elements can be included in cellular communication circuitry 330 and, similarly, one or more processing elements can be included in short range wireless communication circuitry 329. Thus, cellular communication circuitry 330 can include one or more integrated circuits (ICs) that are configured to perform the functions of cellular communication circuitry 330. In addition, each integrated circuit can include circuitry (e.g., first circuitry, second circuitry, etc.) configured to perform the functions of cellular communication circuitry 230. Similarly, the short range wireless communication circuitry 329 can include one or more ICs that are configured to perform the functions of short range wireless communication circuitry 32. In addition, each integrated circuit can include circuitry (e.g., first circuitry, second circuitry, etc.) configured to perform the functions of short range wireless communication circuitry 329.

Figure 4:
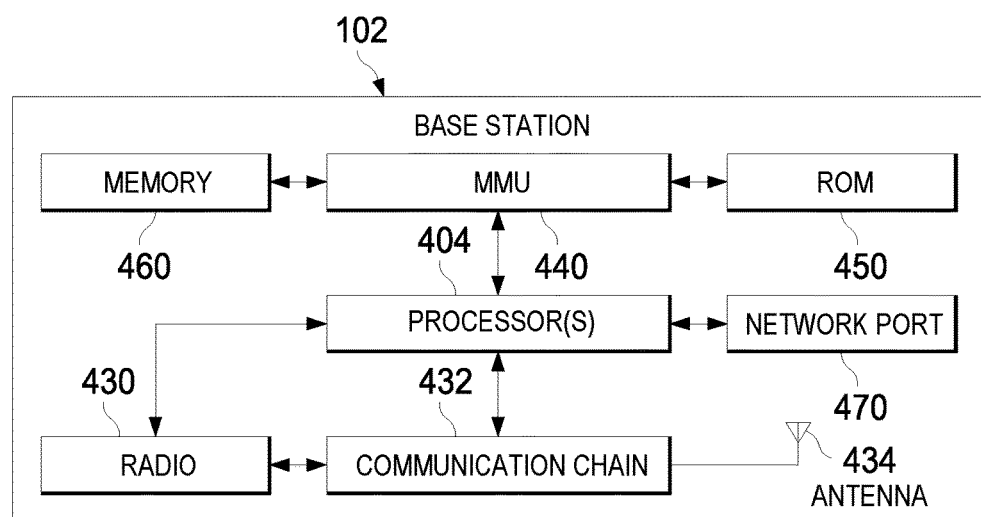
FIG. 4 illustrates an example block diagram of a BS.

FIG. 4 illustrates an example block diagram of a base station 102. It is noted that the base station of FIG. 4 is merely one example of a possible base station. As shown, the base station 102 can include processor(s) 404 which can execute program instructions for the base station 102. The processor(s) 404 can also be coupled to memory management unit (MMU) 440, which can be configured to receive addresses from the processor(s) 404 and translate those addresses to locations in memory (e.g., memory 460 and read only memory (ROM) 450) or to other circuits or devices.

The base station 102 can include at least one network port 470. The network port 470 can be configured to couple to a telephone network and provide multiple devices, such as UE devices 106, access to the telephone network as described above in FIGS. 1 and 2.

The network port 470 (or an additional network port) can also or alternatively be configured to couple to a cellular network, e.g., a core network of a cellular service provider. The core network can provide mobility related services and/or other services to a plurality of devices, such as UE devices 106. In some cases, the network port 470 can couple to a telephone network via the core network, and/or the core network can provide a telephone network (e.g., among other UE devices serviced by the cellular service provider).

In some implementations, base station 102 can be a next generation base station, e.g., a 5G New Radio (5G NR) base station, or "gNB." In such implementations, base station 102 can be connected to a legacy evolved packet core (EPC) network and/or to a NR core (NRC) network. In addition, base station 102 can be considered a 5G NR cell and can include one or more transition and reception points (TRPs). In addition, a UE capable of operating according to 5G NR can be connected to one or more TRPs within one or more gNBs.

The base station 102 can include at least one antenna 434, and possibly multiple antennas. The at least one antenna 434 can be configured to operate as a wireless transceiver and can be further configured to communicate with UE devices 106 via radio 430. The antenna 434 communicates with the radio 430 via communication chain 432. Communication chain 432 can be a receive chain, a transmit chain or both. The radio 430 can be configured to communicate via various wireless communication standards, including, but not limited to, 5G NR, LTE, LTE-A, GSM, UMTS, CDMA2000, Wi-Fi, etc.

The base station 102 can be configured to communicate wirelessly using multiple wireless communication standards. In some instances, the base station 102 can include multiple radios, which can enable the base station 102 to communicate according to multiple wireless communication technologies. For example, as one possibility, the base station 102 can include an LTE radio for performing communication according to LTE as well as a 5G NR radio for performing communication according to 5G NR. In such a case, the base station 102 can be capable of operating as both an LTE base station and a 5G NR base station. As another possibility, the base station 102 can include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 can include hardware and software components for implementing or supporting implementation of features described herein. The processor 404 of the base station 102 can be configured to implement or support implementation of part or all of the methods described herein, e.g., by executing program instructions stored on a memory medium (e.g., a non-transitory computer-readable memory medium). Alternatively, the processor 404 can be configured as a programmable hardware element, such as a Field Programmable Gate Array (FPGA), or as an Application Specific Integrated Circuit (ASIC), or a combination thereof. Alternatively (or in addition) the processor 404 of the BS 102, in conjunction with one or more of the other components 430, 432, 434, 440, 450, 460, 470 can be configured to implement or support implementation of part or all of the features described herein.

In addition, as described herein, processor(s) 404 can be comprised of one or more processing elements. In other words, one or more processing elements can be included in processor(s) 404. Thus, processor(s) 404 can include one or more integrated circuits (ICs) that are configured to perform the functions of processor(s) 404. In addition, each integrated circuit can include circuitry (e.g., first circuitry, second circuitry, etc.) configured to perform the functions of processor(s) 404.

Further, as described herein, radio 430 can be comprised of one or more processing elements. In other words, one or more processing elements can be included in radio 430. Thus, radio 430 can include one or more integrated circuits (ICs) that are configured to perform the functions of radio 430. In addition, each integrated circuit can include circuitry (e.g., first circuitry, second circuitry, etc.) configured to perform the functions of radio 430.

Figure 5:
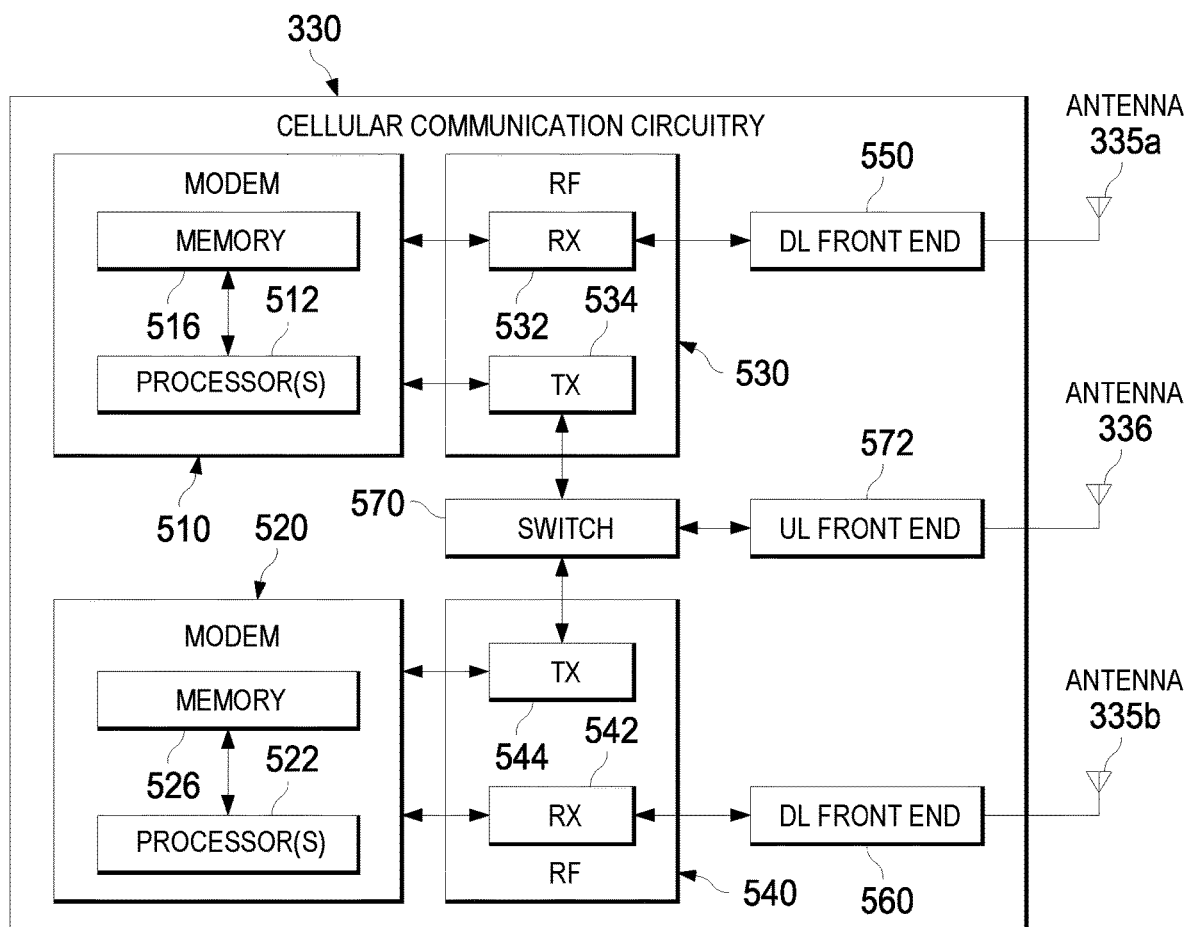
FIG. 5 illustrates an example block diagram of cellular communication circuitry.

FIG. 5 illustrates an example block diagram of cellular communication circuitry. It is noted that the block diagram of the cellular communication circuitry of FIG. 5 is only one example of a possible cellular communication circuit. According to some implementations, cellular communication circuitry 330 can be include in a wireless device, such as wireless device 106 described above. As noted above, wireless device 106 can be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 can couple (e.g., communicatively; directly or indirectly) to one or more antennas, such as antennas 335a-b and 336 as shown in FIG. 3. In some implementations, cellular communication circuitry 330 can include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 can include a modem 510 and a modem 520. Modem 510 can be configured for communications according to a first RAT, e.g., such as LTE or LTE-A, and modem 520 can be configured for communications according to a second RAT, e.g., such as 5GNR.

As shown, modem 510 can include one or more processors 512 and a memory 516 in communication with processors 512. Modem 510 can be in communication with a radio frequency (RF) front end 530. RF front end 530 can include circuitry for transmitting and receiving radio signals. For example, RF front end 530 can include receive circuitry (RX) 532 and transmit circuitry (TX) 534. In some implementations, receive circuitry 532 can be in communication with downlink (DL) front end 550, which can include circuitry for receiving radio signals via antenna 335a.

Similarly, modem 520 can include one or more processors 522 and a memory 526 in communication with processors 522. Modem 520 can be in communication with an RF front end 540. RF front end 540 can include circuitry for transmitting and receiving radio signals. For example, RF front end 540 can include receive circuitry 542 and transmit circuitry 544. In some implementations, receive circuitry 542 can be in communication with DL front end 560, which can include circuitry for receiving radio signals via antenna 335b.

In some implementations, a switch 570 can couple transmit circuitry 534 to uplink (UL) front end 572. In addition, switch 570 can couple transmit circuitry 544 to UL front end 572. UL front end 572 can include circuitry for transmitting radio signals via antenna 336. Thus, when cellular communication circuitry 330 receives instructions to transmit according to the first RAT (e.g., as supported via modem 510), switch 570 can be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 can be switched to a second state that allows modem 520 to transmit signals according to the second RAT (e.g., via a transmit chain that includes transmit circuitry 544 and UL front end 572).

In some implementations, the cellular communication circuitry 330 can be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 can be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some implementations, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 can be configured to receive an allocation of a first UL subframe for transmissions according to the first RAT and an allocation of a second UL subframe for transmissions according to the second RAT. In some implementations, the TDM of the uplink data can be performed at a physical layer of the cellular communication circuitry 330. In some implementations, the cellular communication circuitry 330 can be further configured to receive an allocation of a portion of each UL subframe for control signaling according to one of the first or second RATs.

As described herein, the modem 510 can include hardware and software components for implementing the above features or for time division multiplexing UL data for NSA NR operations, as well as the various other techniques described herein. The processors 512 can be configured to implement part or all of the features described herein, e.g., by executing program instructions stored on a memory medium (e.g., a non-transitory computer-readable memory medium). Alternatively (or in addition), processor 512 can be configured as a programmable hardware element, such as a Field Programmable Gate Array (FPGA), or as an Application Specific Integrated Circuit (ASIC). Alternatively (or in addition) the processor 512, in conjunction with one or more of the other components 530, 532, 534, 550, 570, 572, 335 and 336 can be configured to implement part or all of the features described herein.

In addition, as described herein, processors 512 can include one or more processing elements. Thus, processors 512 can include one or more integrated circuits (ICs) that are configured to perform the functions of processors 512. In addition, each integrated circuit can include circuitry (e.g., first circuitry, second circuitry, etc.) configured to perform the functions of processors 512.

As described herein, the modem 520 can include hardware and software components for implementing the above features for time division multiplexing UL data for NSA NR operations, as well as the various other techniques described herein. The processors 522 can be configured to implement part or all of the features described herein, e.g., by executing program instructions stored on a memory medium (e.g., a non-transitory computer-readable memory medium). Alternatively (or in addition), processor 522 can be configured as a programmable hardware element, such as a Field Programmable Gate Array (FPGA), or as an Application Specific Integrated Circuit (ASIC). Alternatively (or in addition) the processor 522, in conjunction with one or more of the other components 540, 542, 544, 550, 570, 572, 335 and 336 can be configured to implement part or all of the features described herein.

In addition, as described herein, processors 522 can include one or more processing elements. Thus, processors 522 can include one or more integrated circuits (ICs) that are configured to perform the functions of processors 522. In addition, each integrated circuit can include circuitry (e.g., first circuitry, second circuitry, etc.) configured to perform the functions of processors 522.

A physical random access channel (PRACH) can be used to carry random access preambles, which can be used for initiation of a random access procedure. In the frequency domain, several subcarriers at both ends of the, e.g., 6, physical resource blocks (PRBs) can be used with adjacent channels, for example, a physical uplink control channel (PUCCH) and/or a physical uplink shared channel (PUSCH). In the time domain, the cyclic prefix (CP) and guard time (GT) can be used to avoid interference with the previous and next subframes. In some implementations, the GT can be related to the maximum cell radius. A random access preamble can include a sequence, a CP, and a GT. The sequence, CP, and GT can be defined in Ts (e.g., the basic time unit of the standard, which can be specified as a set number of nanoseconds, such as 32.552 ns) and/or in ms. NR supports scaled PRACH (physical random access channel) numerology.

FIG. 6 illustrates an exemplary table of preamble formats. As shown preamble formats 0-3 can be long sequence and formats A1-C2 can be short sequences. The table shows sequence length (L_RA), subcarrier spacing (SCS) in kHz, CP length in Ts (cellular sample length) and in ms, sequence length in Ts and in ms, total length in ms, GT in ms, and cell radius in km (although other units are envisioned wherever desired). The long sequence format can be used for macro cells and the short sequence can be used for smaller cells. Note that the value of u can be specified by the network and can have values of 0, 1, 2, or 3.

Figure 7:
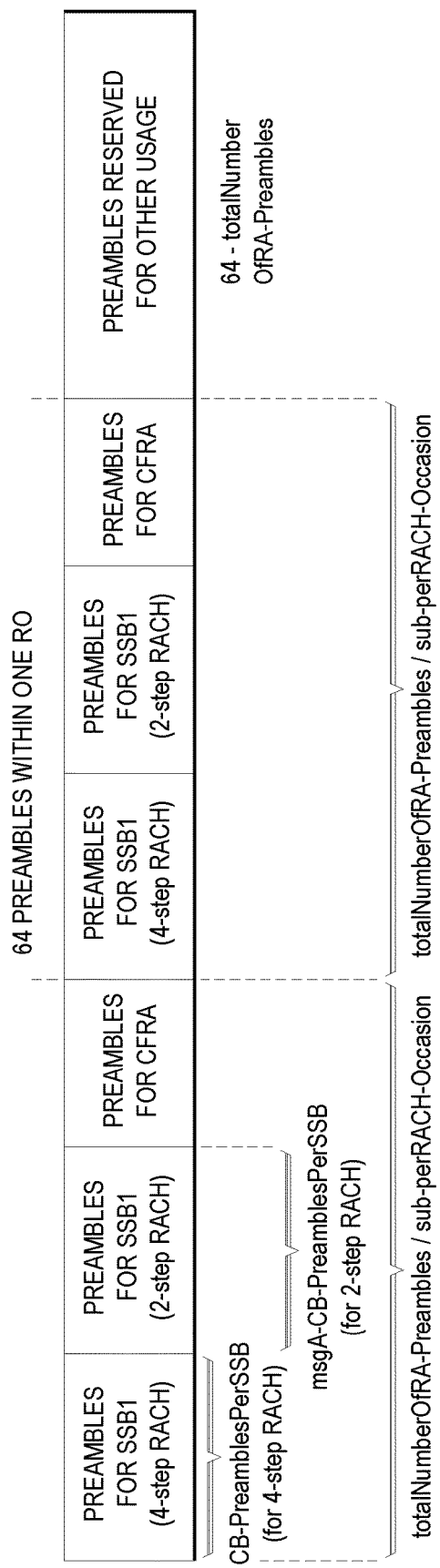
FIG. 7 illustrates example preambles within a random access channel (RACH) occasion (RO).

FIG. 7 illustrates example preambles within a RACH occasion (RO). A UE, for example, the UE 106 illustrated and described in more detail with reference to FIGS. 1 and 3, uses a RACH to perform an initial access sequence with a base station, for example, the base station 102 illustrated and described in more detail with reference to FIGS. 1 and 4. The initial access sequence is performed for the UE 106 to acquire UL synchronization. UL is illustrated and described in more detail with reference to FIG. 5. An RO refers to an area specified in the time and frequency domain that is available for the reception of RACH preambles.

A four-step RACH procedure typically requires two round-trip cycles between the UE 106 and the base station 102. In contrast, a two-step RACH procedure reduces latency and control-signaling overhead by using a single round-trip cycle between the UE 106 and the base station 102. In a two-step RACH procedure, the PRACH preamble (referred to as Msg1) and a scheduled PUSCH transmission (referred to as Msg3) are combined into a single message (referred to as MsgA) from the UE 106. An exemplary table of preamble formats is illustrated and described in more detail with reference to FIG. 6. The random-access response (referred to as Msg2) and the contention resolution message (referred to as Msg4) are combined into a single message (referred to as MsgB) from the base station 102 to the UE 106.

The two-step RACH procedure is able to operate regardless of whether the UE 106 has received a valid timing advance (TA). A TA refers to a command or notification from the base station 102 to the UE 106 that enables the UE 106 to adjust its UL transmission with respect to the PUSCH and the PUCCH. The two-step RACH procedure can be applied when the UE 106 is in an RRC_INACTIVE state, an RRC_CONNECTED state, or an RRC_IDLE state. The UE 106 is in the RRC_CONNECTED state when an RRC connection is established, the radio is active, and the UE 106 is known to the base station 102 and network. The UE 106 is in the RRC_IDLE state when no RRC connection is established, the radio is inactive, and an IP address of the UE 106 may be assigned and tracked by the network. The RRC_INACTIVE state is designed to achieve power savings with acceptable access latency. This state is used for small data transmission such as machine type communications applications.

In some implementations, up to two PUSCH configurations can be used in the RRC_CONNECTED state. In addition, up to two PUSCH configurations can be used in the RRC_IDLE or RRC_INACTIVE states. The preamble group is used to differentiate between the PUSCH configurations. Thus, at most two preamble groups are visible from the perspective of the UE 106 because the UE 106 is in one RRC state at a time. However, from the perspective of the base station 102, up to four preamble groups can be configured for the RRC state of the UE 106. Therefore, as shown in FIG. 7, in some implementations, the UE 106 is configured to generate a PRACH preamble mapped to the PUSCH resource unit (PRU). The PRACH preamble is part of a preamble group that indicates a configuration of the PUSCH. The preamble group contains a number of preambles. The size of the preamble group can be indicated by RRC signaling performed by the UE 106. RRC signaling is described with reference to FIG. 5. The UE 106 encodes a message (MsgA) that includes the PRACH preamble and a payload carried by the PUSCH. In the two-step RACH procedure, the MsgA therefore includes the PRACH preamble and the PUSCH data with a time offset. A mapping between the PRACH preamble and a PUSCH resource unit (PRU) determines the MsgA channel structure.

In some implementations, the at most two preamble groups that can be configured are referred to as preamble Group A and preamble Group B. The base station 102 can create additional preamble groups. The preamble groups created for the UE 106 in the RRC_IDLE and RRC_INACTIVE states can re-use existing preamble group design principle and parameters. The base station 102 can broadcast the number of preambles in one preamble group and the number of preambles in another preamble group for the UE 106 in the RRC_IDLE or RRC_INACTIVE states, for example, using IE numberofRA-PreamblesGroupA and numberofRA-PreamblesGroupB (if Group B is configured) to broadcast the number of preambles in group A and group B respectively under the IE MsgA-PreambleGrouping in a cell, which includes the preamble group A and group B information, such the PUSCH payload size of this group, preamble associated PUSCH information. However, the UE 106 in the RRC_CONNECTED state will ignore the broadcast values. When the UE 106 is in the RRC_CONNECTED state, the dedicated signaling can configure another one or two preamble groups which are different from preamble groups for the RRC_IDLE and RRC_INACITVE states. The IE MsgA-PreambleGrouping includes a dedicated numberofRA-PreamblesGroupA for the UE 106 in the RRC_CONNECTED state and RA-MsgA-SizeGroupA, which is the PUSCH size information. Hence, the preamble groups can be separately configured for the RRC_IDLE and RRC_INACTIVE states and the RRC_CONNECTED state. In some implementations, different configurations of MsgA-PreambleGrouping are used for the UE 106 in the RRC_IDLE or RRC_INACTIVE states, and in the RRC_CONNECTED state, respectively, by introducing the IE numberofRA-PreamblesGroupB. In the RRC_CONNECTED state, a dedicated MsgA-PreambleGrouping configuration (if configured) is used to select the MsgA preamble group.

The PUSCH configuration includes parameters to determine the MsgA PUSCH transmission. Thus, the configuration of the PUSCH includes parameters that the base station 102 can use for decoding the message, MsgA. The UE 106 is coupled communicatively to the base station 102 using the PUSCH, as illustrated and described with reference to FIGS. 1, 3, and 4. The UE 106 transmits the MsgA data to the base station 102, which decodes the MsgA based on the parameters of the configuration of the PUSCH that is indicated by the preamble group. The PUSCH modulation and coding scheme (MCS) and payload size can be different for different PUSCH configurations. The PRACH preamble group is used to differentiate the PUSCH configurations. Therefore, after the base station 102 detects the PRACH preamble generated by the UE 106, the base station 102 determines the associated PUSCH configuration. For example, when the UE 106 is in the RRC_INACTIVE state or the RRC_IDLE state, the PUSCH can have up to two configurations. Similarly, when the UE 106 is in the RRC_CONNECTED state, the PUSCH can have up to two configurations.

In some implementations, the preamble group is one of multiple preamble groups broadcast by the base station 102 to the UEs 106A-N. The configuration of the PUSCH is one of multiple PUSCH configurations associated with the multiple preamble groups. The multiple PUSCH configurations are further associated with a bandwidth part (BWP). The UE 106 can be configured with multiple BWPs. The PRACH resources are always configured using the initial UL BWP. The UE 106 will switch to the initial UL BWP unless the currently active UL BWP is received with the PRACH. If the active BWP is the same as the initial BWP, up to four PUSCH configurations can be recognized by the base station 102. Therefore, four PRACH preamble groups are used for the four PUSCH configurations. From the perspective of the UE 106, up to two PUSCH configurations can be used. Therefore, the UE 106 has knowledge of two PRACH preamble groups for the PUSCH transmission.

The two-step RACH procedure can be implemented either as contention-based random access (CBRA) or contention-free random access (CFRA). For CBRA, the UE 106 selects a PRACH preamble from a pool of preambles shared with other UEs in the cell. For CFRA, the UE 106 uses a dedicated PRACH preamble provided by the base station 102 to the UE 106 via RRC signaling. In FIG. 7, the two-step PRACH preambles are shown allocated from the non-CBRA preambles associated with each synchronization signal block (SSB). The combination of the synchronization signal and the physical broadcast channel (PBCH) is known as the SSB. The MsgA data includes the PRACH preamble and the PUSCH data. The mapping between the PRACH preamble and the PUSCH resource unit (PRU) determines the MsgA channel structure. To generate the MsgA channel structure, the implementations disclosed herein therefore perform two functions. First, the PRACH preambles for the two-step RACH are divided into multiple preamble groups, and the number of preambles in each preamble group is determined. Second, preamble group indexing is performed. That is, each of the preamble groups is mapped to a PUSCH configuration when the UE 106 is in different RRC states. The implementations disclosed herein are illustrated and described in more detail with reference to FIGS. 9-13.

Figure 8:
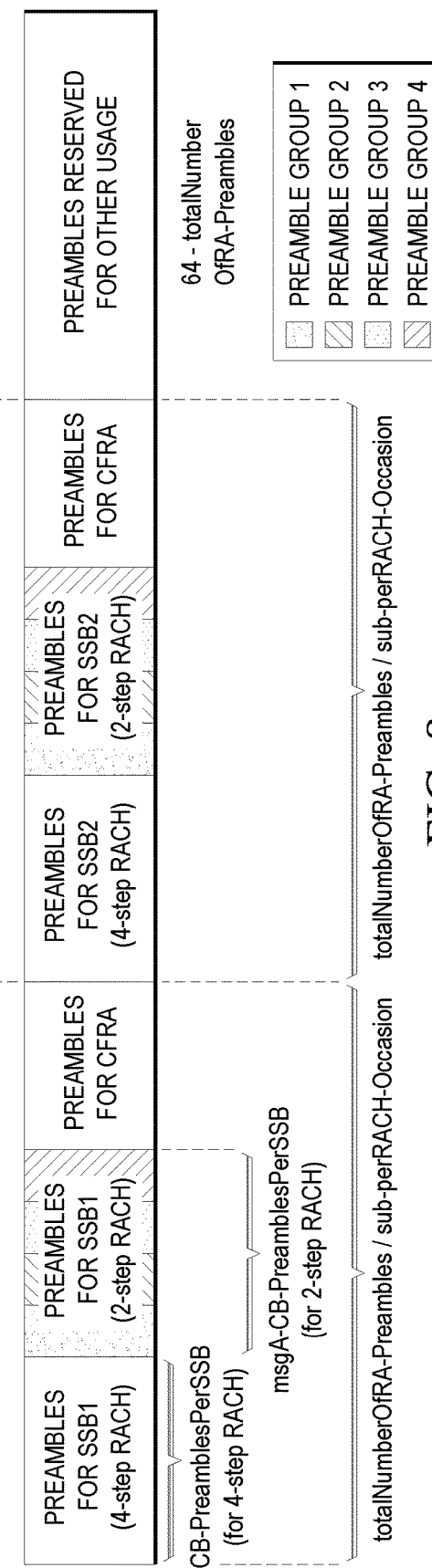
FIG. 8 illustrates example preambles within an RO.

FIG. 8 illustrates example preambles within an RO. In some implementations, as shown in FIG. 8, the UE 106 aggregates multiple PRACH preambles into a preamble group based on RRC signaling performed by the UE 106. RRC signaling is described in more detail with reference to FIGS. 5 and 8. In some implementations, the base station 102 introduces new or additional RRC parameters for each preamble group. The parameters can include, for example, a starting preamble index and a number of preambles in a preamble group (size of the preamble group). The preamble group indicates the PUSCH configuration used for communication between the UE 106 and the base station 102.

In some implementations, the UE 106 determines a size of the preamble group using at least one of a ceiling operation or a floor operation performed on a number of contention-based preambles used for the two-step RACH. The UE 106 is further configured to determine the size of the preamble group using a sum of: a first number of preambles associated with an RRC_CONNECTED state of the UE 106; and a second number of preambles associated with an RRC_IDLE state of the UE 106 or an RRC_INACTIVE state of the UE 106. For example, the UE 106 can implicitly derive the preambles in each preamble group using a ceiling or floor operation, for example, as in expression (1).

$$\text{Ceiling}\left(\frac{MsgA\text{-}CB\text{-}PreamblesPerSSB}{\text{Number of configured preamble group}}\right) \quad (1)$$

Here, MsgA-CB-preamblesPerSSB denotes a number of contention-based preambles used for the two-step RACH. The "Number of configured preamble group" value is derived from the value of MsgA-PUSCH-ConfigList for the RRC_CONNECTED state, and from the MsgA-PUSCH-ConfigList for the RRC_IDLE or RRC_INACTIVE states, that is, the preamble group of the RRC_CONNECTED state plus the preamble group of the RRC_IDLE or the RRC_INACTIVE state. The UE 106 selects a particular PRACH preamble from the preamble group based on the configuration of the PUSCH. The UE 106 encodes the MsgA data (including the PRACH preamble and the payload carried by the PUSCH). The configuration of the PUSCH includes parameters for decoding the MsgA.

In some implementations, the configuration of the PUSCH is one of multiple PUSCH configurations associated with an RRC_CONNECTED state of the wireless device. For example, the base station 102 can fix the relationship between the preamble group index and the PUSCH configuration in the specification. Thus, Preamble group index #1 corresponds to MsgA-PUSCH-Config #1 in the RRC_CONNECTED state, and Preamble group index #2 corresponds to MsgA-PUSCH-Config #2 of in the RRC_CONNECTED state. In some implementations, the configuration of the PUSCH is one of multiple configurations associated with an RRC_IDLE state of the wireless device or an RRC_INACTIVE state of the wireless device. Thus, Preamble group index #3 corresponds to MsgA-PUSCH-Config #1 in the RRC_IDLE or RRC_INACTIVE states, and Preamble group index #4 corresponds to MsgA-PUSCH-Config #2 in the RRC_IDLE or RRC_INACTIVE states. If one of the PUSCH configurations is not explicitly set, the corresponding preamble group will be empty, that is, there will be no preambles is in that preamble group. As shown in FIG. 8, therefore, the preamble indexes in an RO increase as the preamble group index increases.

In some implementations, the relationship between the preamble group index and the MsgA PUSCH configuration is configurable. For example, the Preamble group index #x is enumerated from the set {MsgA-PUSCH-Config #1 in the RRC_CONNECTED state; MsgA-PUSCH-Config #2 in the RRC_CONNECTED state; MsgA-PUSCH-Config #1 in the RRC_IDLE or RRC_INACTIVE states, MsgA-PUSCH-Config #2 in the RRC_IDLE or RRC_INACTIVE states}, where x belongs to the set {1,2,3,4}. As shown in FIG. 8, therefore, the preamble indexes in an RO increase as the preamble group index increases.

Referring again to FIG. 8, in some implementations, the UE 106 is further configured to receive the preamble group from the base station 102 when the UE 106 is in an RRC_IDLE state or an RRC_INACTIVE state. The base station 102 can configure two PUSCH configurations for the RRC_CONNECTED state and two PUSCH configurations for the RRC_IDLE and RRC_INACTIVE states. The total number of preambles allocated for the two-step RACH, that is, MsgA-CB-PreamblesPerSSB, is divided into four blocks, for example, preamble group #1 to preamble group #4. For example, if the value of CB-PreamblesPerSSB is set to 16 for the four-step RACH, and the value of MsgA-CB-PreamblesPerSSB is set to 25, then 16 and 25 preambles each are allocated for the four-step RACH and two-step RACH respectively. The preamble index for the two-step RACH is in a range from #16 to #40.

In some implementations, as described previously with reference to FIG. 8, a ceiling operation is applied to determine the preamble number of each preamble group. Therefore, preambles #{16, 17, 18, 19, 20, 21, 22} belong to preamble group #1; preambles #{23, 24, 25, 26, 27, 28, 29} belong to preamble group #2; preambles #{30, 31, 32, 33, 34, 35, 36} belong to preamble group #3; and preambles #{37, 38, 39, 40} belong to preamble group #4. The preamble group index can also be linked to the PUSCH configuration as described previously with respect to fixing the relationship between the preamble group index and the PUSCH configuration by the base station 102.

In other implementations, the preamble group index is flexibly configured, as described by the enumeration procedure previously. For example, Preamble group #1 (preambles #{16, 17, 18, 19, 20, 21, 22}) is mapped to PUSCH configuration #1 in the RRC_CONNECTED state; Preamble group #2 (preambles #{23, 24, 25, 26, 27, 28, 29}) is mapped to PUSCH configuration #1 in the RRC_IDLE or RRC_INACTIVE states; Preamble group #3 (preambles #{30, 31, 32, 33, 34, 35, 36}) is mapped to PUSCH configuration #2 in the RRC_CONNECTED state; and Preamble group #4 (preambles #{37, 38, 39, 40}) is mapped to PUSCH configuration #2 in the RRC_IDLE or RRC_INACTIVE states.

Figure 9:
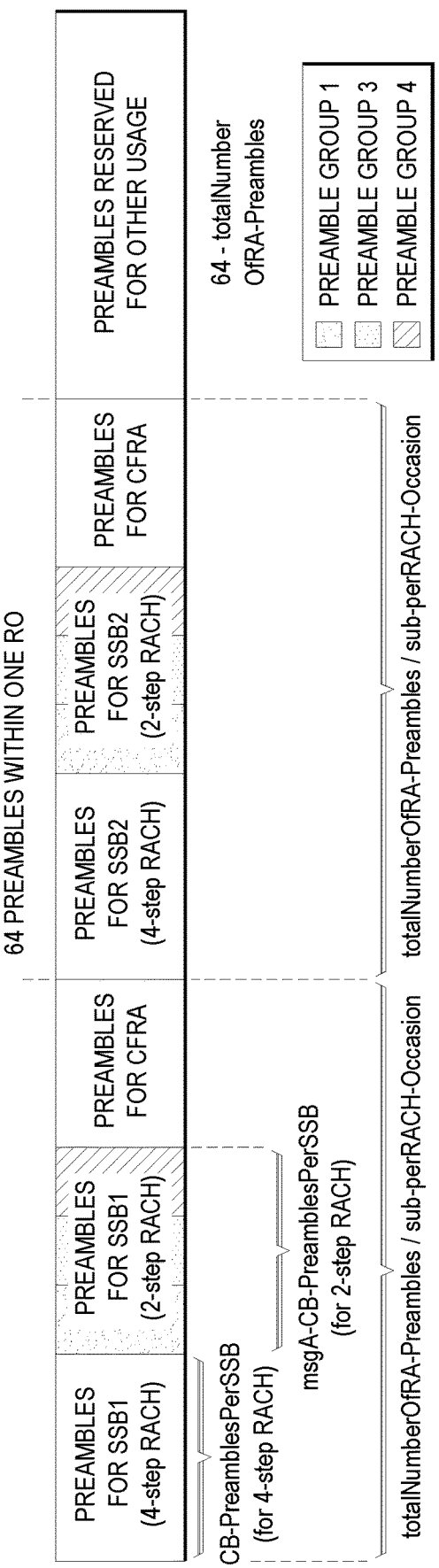
FIG. 9 illustrates example preambles within an RO.

FIG. 9 illustrates example preambles within an RO. In some implementations, the UE 106 aggregates multiple PRACH preambles into a preamble group based on RRC signaling performed by the UE 106, as described in more detail with reference to FIGS. 5 and 8. The preamble group indicates a configuration of the PUSCH used for communication between the UE 106 and the base station 102. The UE 106 further determines a size of the preamble group using at least one of a ceiling operation or a floor operation performed on a number of contention-based preambles used for a two-step RACH. For example, the base station 102 configures one PUSCH configuration in the RRC_CONNECTED state and two PUSCH configurations in the RRC_IDLE and RRC_INACTIVE states. The total number of preambles allocated for the two-step RACH (MA-CB-PreamblesPerSSB) is divided into three blocks, but with four preamble groups (preamble group #1 to preamble group #4). For example, if CB-PreamblesPerSSB is set to 16 for the four-step RACH and MsgA-CB-PreamblesPerSSB is set to 25 as shown in FIG. 9, then 16 and 25 preambles each are allocated for the four-step RACH and two-step RACH respectively. The preamble index for the two-step RACH is in a range from #16 to #40. The ceiling operation can be applied to determine the preamble number of each preamble group. For example, preambles #{16, 17, 18, 19, 20, 21, 22, 23, 24} belong to preamble group #1; no preambles belong to preamble group #2; preambles #{25, 26, 27, 28, 29, 30, 31, 32, 33} belong to preamble group #3; and preambles #{34, 35, 36, 37, 38, 39, 40} belong to preamble group #4.

In some implementations, the configuration of the PUSCH is one of multiple PUSCH configurations associated with an RRC_CONNECTED state of the UE 106. Preamble groups can be separately indicated for different RRC states of the UE 106. For example, when the UE 106 is in the RRC_IDLE or RRC_INACTIVE states, the base station 102 broadcasts preamble groups, such as Group A and Group B (if the Group B is configured). When the UE 106 is in the RRC_CONNECTED state, the UE-specific signaling informs the preamble groups for the RRC_CONNECTED state—the number of preambles for Group A2 and Group B2 (if the Group B is configured). The Group A2 starts after Group B if Group B is configured. If Group B is not configured, Group A2 starts after Group A.

Figure 10:
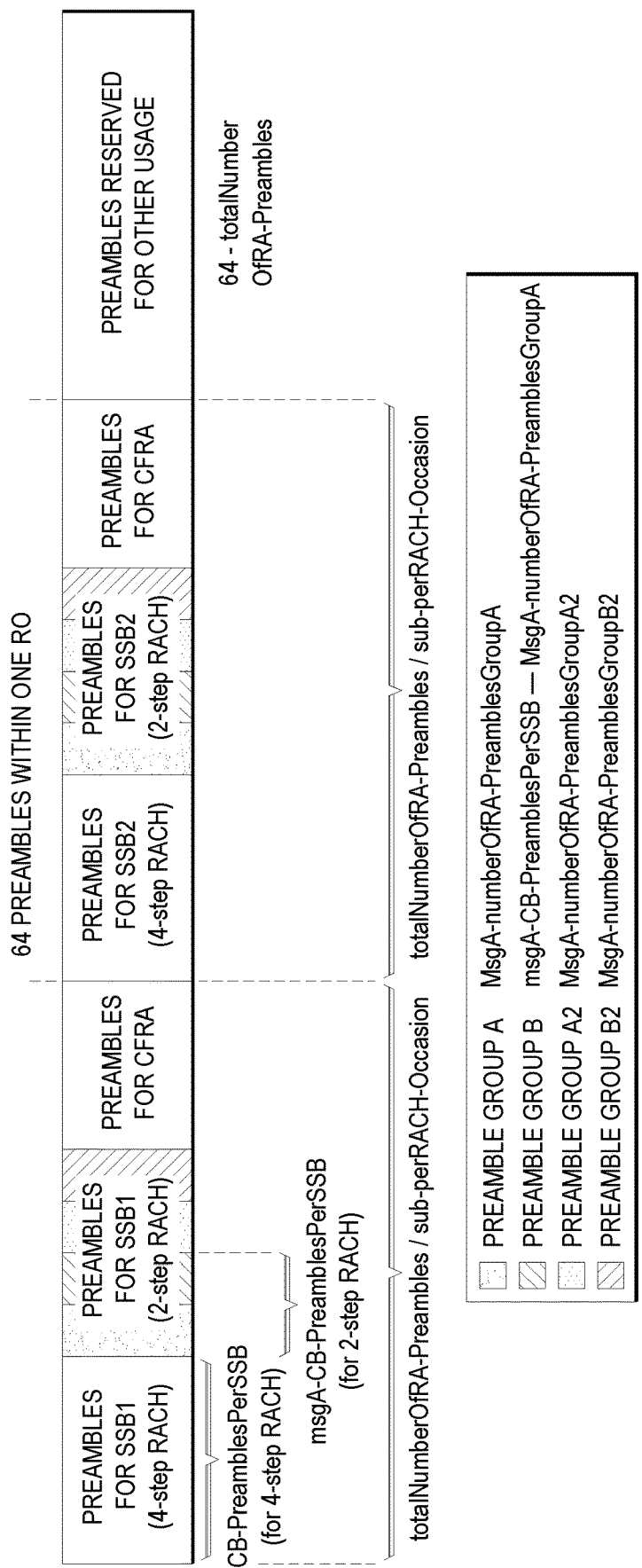
FIG. 10 illustrates example preambles within an RO.

FIG. 10 illustrates example preambles within an RO. In some implementations, the UE 106 aggregates multiple PRACH preambles into a preamble group based on RRC signaling performed by the UE 106. The preamble group indicates a configuration of a PUSCH used for communication between the UE 106 and the base station 102. The UE 106 further determines a size of the preamble group using at least one of a ceiling operation or a floor operation performed on a number of contention-based preambles used for a two-step RACH. For example as shown in FIG. 10 for a shared RO, the value of MsgA-CB-PreamblesPerSSB is the number of contention-based random access preambles mapped to each SSB. If the base station 102 broadcasts MsgA-groupBconfigured (a new RRC parameter for the UE 106 in the RRC_IDLE state), the random access preamble group B is configured. If the parameter MsgA-groupBconfigured is configured, then Group B is configured. If MsgA-groupBconfigured is not configured, then Group B is not configured.

In some implementations, among the contention-based random access preambles associated with an SSB (indicated by MsgA-CB-PreamblesPerSSB) for the two-step RACH, the first MsgA-numberOfRA-PreamblesGroupA (a new RRC parameter) random access preambles belong to the random access preambles Group A. The parameter MsgA-numberofRA-PreamblesGroupA denotes a number of CB preambles per SSB in Group A for the RRC_IDLE/RRC_INACTIVE or the RRC_CONNECTED states. The values for the number of preambles for each group are consistent with SSB-perRACH-OccasionAndCB-PreamblesPerSSB-TwoStepRA or MsgA-CB-PreamblesPerSSB, if configured. The parameter MsgA-numberOfRA-PreamblesGroupA represents the number of preambles in Group A for the two-step RACH. The remaining random access preambles associated with the SSB belong to the random access preambles Group B (if Group B is configured), that is MsgA-CB-PreamblesPerSSB-MsgA-numberOfRA-PreamblesGroupA. The parameter MsgA-CB-PreamblesPerSSB is updated to include only the preambles of Group A and Group B.

When the UE 106 is in the RRC_CONNECTED state, the base station 102 configures the new RRC parameters msgA-numberOfRA-PreamblesGroupA2 and msgA-numberOfRAPreamblesGroupB2. As shown in FIG. 10, for separate ROs, the process is repeated with the parameter MsgA-totalNumberOfRA-Preambles replacing the parameter MsgA-CB-PreamblesPerSSB. MsgA-totalNumberOfRA-Preambles denotes the total number of preambles allocated for the two-step RACH for separated RO between two-step RACH and four-step RACH. The parameter MessagePowerOffsetGroupB denotes a threshold for preamble selection, and it is measured in decibels (dB). The value "minusinfinity" corresponds to –infinity. The value "dB0" corresponds to 0 dB, "dB5" corresponds to 5 dB, and so on. This parameter is not used when only one preamble group is configured. The parameter MsgA-PUSCH-ResourceIdGroupA denotes a resource ID mapping to a MsgA PUSCH configuration for Group A. The parameter MsgA-PUSCH-ResourceIdGroupB denotes a resource ID mapping to a MsgA PUSCH configuration for group B. The parameter RA-MsgA-SizeGroupA denotes a transport block size threshold in bits below which the UE 106 uses a contention-based random access preamble from Group A. this parameter is not used when only one preamble group is configured.

Figure 11:
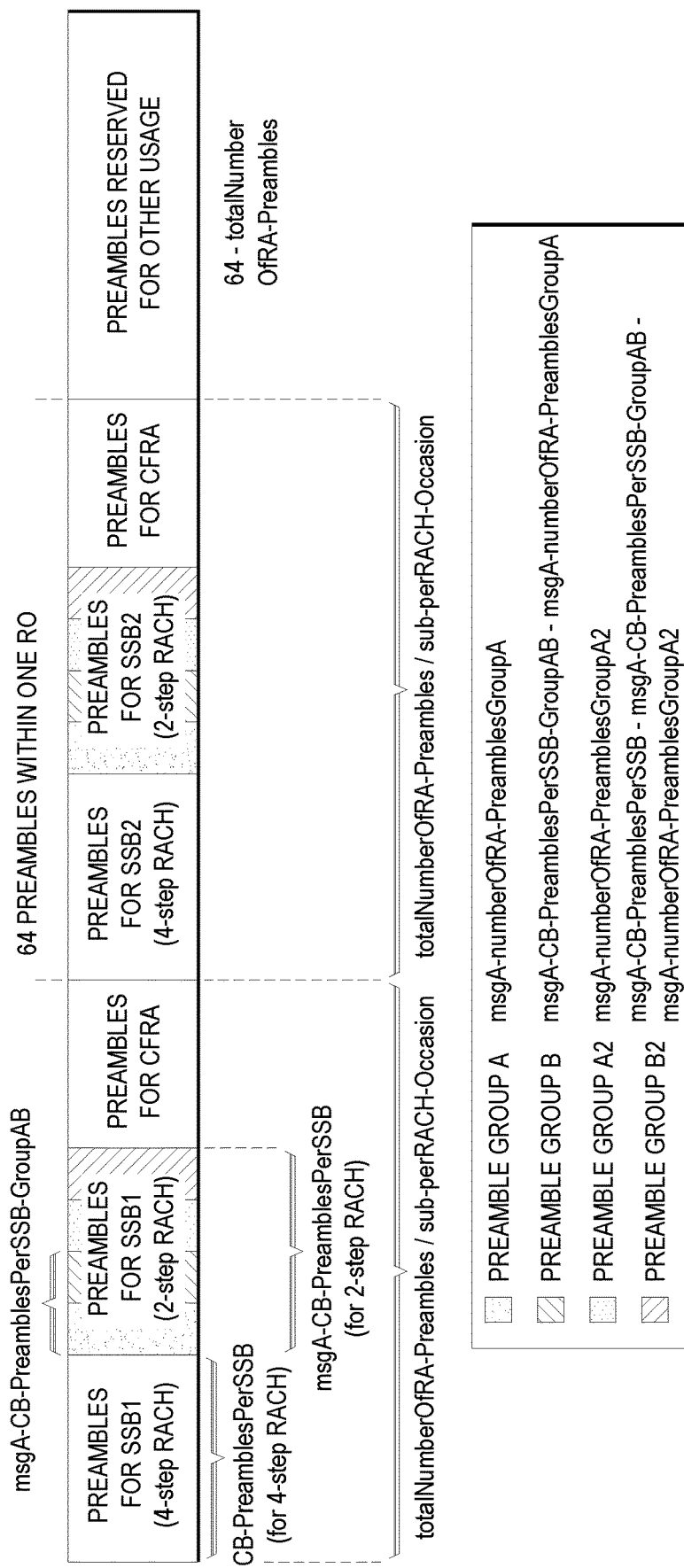
FIG. 11 illustrates example preambles within an RO.

FIG. 11 illustrates example preambles within an RO. For a shared RO, the value of MsgA-CB-PreamblesPerSSB is the number of contention-based random access preambles mapped to each SSB. As shown, in FIG. 11, if the base station 102 broadcasts MsgA-groupBconfigured (a new RRC parameter for the UE 106 in the RRC_IDLE state), the random access preambles Group B is configured. Among the contention-based random access preambles associated with an SSB (indicated by the value of MsgA-CB-PreamblesPerSSB) for the two-step RACH, the first MsgA-numberOfRA-PreamblesGroupA (a new RRC parameter) random access preambles belong to the random access preambles Group A. As shown in FIG. 11, the remaining random access preambles associated with the SSB belong to the random access preambles Group B (if Group B is configured), that is, (MsgA-CB-PreamblesPerSSB-GroupAB-MsgA-numberOfRA-PreamblesGroupA). The parameter MsgA-CB-PreamblesPerSSB-GroupAB denotes the number of preambles in Group A and Group B.

In some implementations, when the UE 106 is in the RRC_CONNECTED state, the base station 102 configures a new RRC parameter MsgA-numberOfRA-PreamblesGroupA2. The number of preambles in Group B2 is derived from (MsgA-CB-PreamblesPerSSB-MsgA-CB-PreamblesPerSSB-GroupAB-MsgA-numberOfRA-PreamblesGroupA2). For a separated RO, the process is repeated with the parameter MsgA-totalNumberOfRA-Preambles replacing MsgA-CB-PreamblesPerSSB.

In some implementations, when the UE 106 is in the RRC_CONNECTED state, the preamble group-based method as defined for the RRC_IDLE or RRC_INACTIVE states is reused for the indication of multiple PUSCH configurations. For example, the number of MsgA PUSCH configuration(s) can be different from that in the RRC_IDLE or RRC_INACTIVE states. The PRACH configuration(s) and MsgA PUSCH configuration(s) are each cell specific and configured per BWP. Further, in some implementations, the number of preamble groups for the two-step RACH is aligned with the number of MsgA PUSCH configurations in a BWP. If the active UL BWP and the initial UL BWP have the same subcarrier spacing (SCS) and the same CP length, and the active UL BWP includes all the resource blocks (RBs) of the initial UL BWP or the active UL BWP is the same as the initial UL BWP, then the preamble grouping and the MsgA PUSCH configurations are implemented at the base station 102. The preamble grouping is thus configured per UL BWP. For an overlapped UL BWP, there can be up to four PUSCH configurations from the perspective of the base station 102, and up to two PUSCH configurations from the perspective of the UE 106.

FIG. 12 illustrates a process of operation for apparatus, systems, and methods for channel structure construction for a two-step RACH. In some implementations, the process of FIG. 12 is performed by the UE 106, illustrated and described in more detail with reference to FIG. 3. In other implementations, steps of the process of FIG. 12 are performed by the base station 102, illustrated and described in more detail with reference to FIG. 4.

The UE 106 generates (1204) a PRACH preamble mapped to a PUSCH resource unit. The PRACH preamble is associated with a preamble group indicating a configuration of the PUSCH. The preamble group has a size indicated by radio resource control (RRC) signaling performed by the UE 106. A four-step RACH procedure typically requires two round-trip cycles between the UE 106 and the base station 102. In contrast, a two-step RACH procedure reduces latency and control-signaling overhead by using a single round-trip cycle between the UE 106 and the base station 102. In a two-step RACH procedure, the PRACH preamble (referred to as Msg1) and a scheduled PUSCH transmission (referred to as Msg3) are combined into a single message (referred to as MsgA) from the UE 106.

The UE 106 encodes (1208) a message (MsgA) including the PRACH preamble and a payload carried by the PUSCH. The configuration of the PUSCH includes parameters for decoding the message. In the two-step RACH procedure, the MsgA therefore includes the PRACH preamble and the PUSCH data with a time offset. A mapping between the PRACH preamble and a PUSCH resource unit (PRU) determines the MsgA channel structure.

The UE 106 couples (1212) the UE 106 communicatively to a base station, for example, the base station 102, using the PUSCH. The PUSCH modulation and coding scheme (MCS) and payload size can be different for different PUSCH configurations. The PRACH preamble group is used to differentiate the PUSCH configurations. Therefore, after the base station 102 detects the PRACH preamble generated by the UE 106, the base station 102 determines the associated PUSCH configuration. For example, when the UE 106 is in the RRC_INACTIVE state or the RRC_IDLE state, the PUSCH can have up to two configurations. Similarly, when the UE 106 is in the RRC_CONNECTED state, the PUSCH can have up to two configurations.

The UE 106 transmits (1216) the message to the base station 102. The base station 102 decodes the message based on the parameters of the configuration of the PUSCH indicated by the preamble group. In some implementations, the preamble group is one of multiple preamble groups broadcast by the base station 102 to the UEs 106A-N. The configuration of the PUSCH is one of multiple PUSCH configurations associated with the multiple preamble groups. The multiple PUSCH configurations are further associated with a BWP. If the active BWP is the same as the initial BWP, up to four PUSCH configurations can be recognized by the base station 102. Therefore, four PRACH preamble groups are used for the four PUSCH configurations. From the perspective of the UE 106, up to two PUSCH configurations can be used. Therefore, the UE 106 has knowledge of two PRACH preamble groups for the PUSCH transmission.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing description, implementations of the invention have been described with reference to numerous specific details that may vary from implementation to implementation. The description and drawings are, accordingly, to be regarded in an illustrative rather than a restrictive sense. Any definitions expressly set forth herein for terms contained in such claims shall govern the meaning of such terms as used in the claims.

What is claimed is:

1. A wireless device comprising:
   one or more computer processors configured to cause the wireless device to:
      generate a physical random access channel (PRACH) preamble mapped to a physical uplink shared channel (PUSCH) resource unit, the PRACH preamble associated with a preamble group indicating a configuration of the PUSCH, the preamble group having a size and a group index indicated by radio resource control (RRC) signaling received by the wireless device from a base station, wherein the group index identifies the preamble group from a plurality of preamble groups;
      determine the size of the preamble group using at least one of a ceiling operation or a floor operation performed on a number of contention-based preambles and a number of preamble groups used for a two-step random access channel (RACH);
      encode a message comprising the PRACH preamble and a payload carried by the PUSCH, the configuration of the PUSCH comprising parameters for decoding the message; and
      transmit the message to the base station, wherein the base station decodes the message based on the parameters of the configuration of the PUSCH indicated by the preamble group.

2. The wireless device of claim 1, wherein the one or more computer processors are further configured to cause the wireless device to determine the size of the preamble group in accordance with the RRC signaling.

3. The wireless device of claim 2, wherein the one or more computer processors are further configured to cause the wireless device to receive the preamble group from the base station when the wireless device is in an RRC_IDLE state or an RRC_INACTIVE state, wherein a first subset of preambles in the preamble group is associated with the RRC_IDLE state or the RRC_INACTIVE state.

4. The wireless device of claim 3, wherein a second subset of preambles in the preamble group is also associated with the RRC_IDLE state or the RRC_INACTIVE state.

5. The wireless device of claim 2, wherein the one or more computer processors are further configured to cause the wireless device to receive the preamble group from the base station when the wireless device is in an RRC_CONNECTED state, wherein a first subset of preambles in the preamble group is associated with the RRC_CONNECTED state.

6. The wireless device of claim 5, wherein a second number of preambles in the preamble group is also associated with the RRC_CONNECTED state.

7. The wireless device of claim 1, wherein the configuration of the PUSCH is one of a plurality of PUSCH configurations associated with the plurality of preamble groups, the plurality of PUSCH configurations further associated with a bandwidth part (BWP).

8. A non-transitory computer-readable storage medium storing computer instructions, which when executed by one or more computer processors, cause the one or more computer processors to:
   aggregate a plurality of physical random access (PRACH) preambles into a preamble group based on radio resource control (RRC) signaling received by a wireless device, the preamble group indicating a configuration of a physical uplink shared channel (PUSCH) used for communication between the wireless device and a base station;
   determine a size of the preamble group using at least one of a ceiling operation or a floor operation performed on a number of contention-based preambles and a number of preamble groups used for a two-step random access channel (RACH);
   select a first PRACH preamble from the preamble group;
   encode a message comprising the first PRACH preamble and a payload carried by the PUSCH, the configuration of the PUSCH comprising parameters for decoding the message; and
   transmit the message to the base station, wherein the base station decodes the message based on the parameters of the configuration of the PUSCH indicated by the preamble group.

9. The non-transitory computer-readable storage medium of claim 8, wherein the computer instructions further cause the one or more computer processors to determine a size of the preamble group in accordance with the RRC signaling.

10. The non-transitory computer-readable storage medium of claim 9, wherein the computer instructions further cause the one or more computer processors to receive the preamble group from the base station, wherein a first number of preambles is associated with an RRC_IDLE state or an RRC_INACTIVE state.

11. The non-transitory computer-readable storage medium of claim 10, wherein a second number of preambles is associated with the RRC_IDLE state or the RRC_INACTIVE state.

12. The non-transitory computer-readable storage medium of claim 9, wherein the computer instructions further cause the one or more computer processors to receive the preamble group from the base station, wherein a first number of preambles is associated with an RRC_CONNECTED state.

13. The non-transitory computer-readable storage medium of claim 12, wherein a second number of preambles is associated with the RRC_CONNECTED state.

14. The non-transitory computer-readable storage medium of claim 8, wherein the preamble group is one of a plurality of preamble groups and the configuration of the PUSCH is one of a plurality of PUSCH configurations associated with the plurality of preamble groups, the plurality of PUSCH configurations further associated with a bandwidth part (BWP).

15. A method comprising:
  receiving, by a wireless device via radio resource control (RRC) signaling, information indicative of a plurality of physical random access (PRACH) preambles;
  determining a preamble group that includes at least a subset of the plurality of PRACH preambles, the preamble group indicating a configuration of a physical uplink shared channel (PUSCH) used for communication between the wireless device and a base station;
  determining, by the wireless device, a size of the preamble group using at least one of a ceiling operation or a floor operation performed on a number of contention-based preambles and a number of preamble groups used for a two-step random access channel (RACH);
  selecting, by the wireless device, a first PRACH preamble from the preamble group;
  encoding, by the wireless device, a message comprising the first PRACH preamble and a payload carried by the PUSCH, the configuration of the PUSCH comprising parameters for decoding the message; and
  transmitting, by the wireless device, the message to the base station, wherein the base station decodes the message based on the parameters of the configuration of the PUSCH indicated by the preamble group.

16. The method of claim 15, further comprising determining a size of the preamble group in accordance with the RRC signaling.

17. The method of claim 16, further comprising receiving, by the wireless device, the preamble group from the base station when the wireless device is in an RRC_IDLE state or an RRC_INACTIVE state, wherein a first number of preambles is associated with the RRC_IDLE state of the wireless device or the RRC_INACTIVE state of the wireless device.

* * * * *

UNITED STATES PATENT AND TRADEMARK OFFICE
CERTIFICATE OF CORRECTION

PATENT NO. : 11,706,809 B2  
APPLICATION NO. : 17/174315  
DATED : July 18, 2023  
INVENTOR(S) : Chunhai Yao et al.

Page 1 of 1

It is certified that error appears in the above-identified patent and that said Letters Patent is hereby corrected as shown below:

On the Title Page

Column 1 (Foreign Application Priority Data), Line 1, Delete "(WO)" and insert -- (CN) --;

In the Claims

Column 22, Line 36, in Claim 8 delete "physical random access (PRACH)" and insert -- physical random access channel (PRACH) --; and Column 23, Line 25, in Claim 15 delete "physical random access (PRACH)" and insert -- physical random access channel (PRACH) --.

Signed and Sealed this  
Tenth Day of October, 2023

Katherine Kelly Vidal  
*Director of the United States Patent and Trademark Office*